US010011299B2

(12) United States Patent
Janardhana et al.

(10) Patent No.: US 10,011,299 B2
(45) Date of Patent: Jul. 3, 2018

(54) TRAILER ANGLE DETECTION USING REAR CAMERA

(71) Applicant: Robert Bosch GmbH, Stuttgart (DE)

(72) Inventors: Rajani Janardhana, Northville, MI (US); Matthew Baran, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 15/134,966

(22) Filed: Apr. 21, 2016

(65) Prior Publication Data

US 2017/0305462 A1 Oct. 26, 2017

(51) Int. Cl.
*B62D 13/00* (2006.01)
*B60R 11/04* (2006.01)
*B60R 1/00* (2006.01)
*G06K 9/00* (2006.01)
*B62D 15/02* (2006.01)

(52) U.S. Cl.
CPC .............. *B62D 13/005* (2013.01); *B60R 1/00* (2013.01); *B60R 1/003* (2013.01); *B60R 11/04* (2013.01); *B62D 15/028* (2013.01); *B62D 15/0285* (2013.01); *G06K 9/00791* (2013.01); *B60R 2300/50* (2013.01); *B60R 2300/607* (2013.01); *B60R 2300/806* (2013.01)

(58) Field of Classification Search
None
See application file for complete search history.

(56) References Cited

U.S. PATENT DOCUMENTS

| 8,138,899 B2 | 3/2012 | Ghneim |
| 9,154,746 B2 | 10/2015 | Kageta |
| 2005/0201592 A1* | 9/2005 | Peach ................. G06K 9/3258 382/104 |
| 2013/0038731 A1 | 2/2013 | Brey et al. |
| 2014/0058622 A1* | 2/2014 | Trombley ................ B60R 1/00 701/33.2 |

(Continued)

FOREIGN PATENT DOCUMENTS

| DE | 102008045436 A1 | 3/2010 |
| GB | 2447672 A | 9/2008 |

(Continued)

*Primary Examiner* — Rami Khatib
(74) *Attorney, Agent, or Firm* — Michael Best & Friedrich LLP

(57) ABSTRACT

A trailer angle detection system and method of detecting a trailer of a vehicle including a wide-angle camera and a controller. The controller is configured to receive a signal from the wide-angle camera representative of an area behind the vehicle. The controller transforms the signal into a top-down image. The controller determines a first plurality of values. Each of the first plurality of values is indicative of an amount of symmetry in a region of the top-down image. The controller determines a second plurality of values. Each of the second plurality of values is indicative of how closely a shape in the top-down image matches a predetermined shape. Then, the controller determines an estimate of an articulation angle based on the first plurality of values and the second plurality of values. Then controller performs an automated vehicle maneuver based on the estimate of the articulation angle.

16 Claims, 9 Drawing Sheets

(56) References Cited

U.S. PATENT DOCUMENTS

| | | |
|---|---|---|
| 2014/0151979 A1 | 6/2014 | Puckett et al. |
| 2014/0324295 A1 | 10/2014 | Lavoie |
| 2015/0138340 A1 | 5/2015 | Lavoie |
| 2015/0286878 A1 | 10/2015 | Molin et al. |
| 2015/0321697 A1* | 11/2015 | Lu .......................... B60D 1/245 701/28 |
| 2016/0049020 A1 | 2/2016 | Kuehnle et al. |

FOREIGN PATENT DOCUMENTS

| | | |
|---|---|---|
| JP | 2001034768 A | 2/2001 |
| JP | 2011065434 A | 3/2011 |
| WO | 0209433 A1 | 1/2002 |

\* cited by examiner

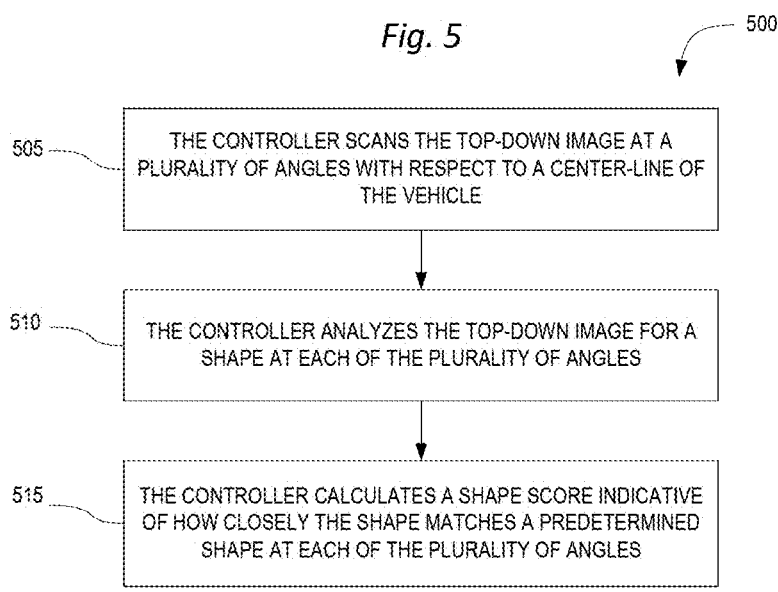

TRAILER ANGLE DETECTION USING REAR CAMERA

FIELD

Embodiments of the invention relate to automated vehicle control systems.

BACKGROUND

Automated vehicle control systems provide various types of functionality to a vehicle. One of the functions of automated vehicle control systems is performing automated maneuvers while a trailer is coupled to the vehicle. Since a driver of the vehicle may have an obstructed view due to, for example, the trailer and since manual maneuvering of the vehicle with the trailer coupled to the vehicle (a vehicle-trailer combination) may be difficult, automated functionality may provide benefits to the driver.

SUMMARY

One example of an automated vehicle control system assists a driver in parking a vehicle-trailer combination by automatically controlling speed and direction of the vehicle based on various inputs. One type of input may include an articulation angle of the trailer (for example, an angle of the trailer with respect to the vehicle). Previously, automated control systems relied on a dedicated angle sensor to detect the articulation angle. Embodiments presented herein may forego the dedicated angle sensor and provide a system and method of determining an articulation angle based on a wide-angle camera.

One embodiment provides a trailer angle detection system for a vehicle. The system includes a wide-angle camera configured to capture a rear field-of-view of the vehicle. The system also includes a controller that has an electronic processor and a memory. The controller is communicatively coupled to the wide-angle camera and configured to receive a signal from the wide-angle camera representative of an area behind the vehicle. The controller transforms the signal into a top-down image. The controller determines a first plurality of values. Each of the first plurality of values is indicative of an amount of symmetry in a region of the top-down image. The controller determines a second plurality of values. Each of the second plurality of values is indicative of how closely a shape in the top-down image matches a predetermined shape. Then, the controller determines an estimate of an articulation angle based on the first plurality of values and the second plurality of values. The controller performs an automated vehicle maneuver based on the estimate of the articulation angle.

Another embodiment provides a method of performing trailer angle detection for a vehicle. The method includes receiving, at a controller, a signal from a wide-angle camera representative of an area behind the vehicle. The controller transforms the signal into a top-down image. Then, the controller determines a first plurality of values. Each of the first plurality of values is indicative of an amount of symmetry in a region of the top-down image. The controller determines a second plurality of values, each of the second plurality of values indicative of how closely a shape in the top-down image matches a predetermined shape. The method includes determining, by the controller, an estimate of an articulation angle based on the first plurality of values and the second plurality of values and performing an automated vehicle maneuver based on the estimate of the articulation angle.

Other aspects and embodiments of the invention will become apparent by consideration of the detailed description and accompanying drawings.

BRIEF DESCRIPTION OF THE DRAWINGS

FIG. 5 is a flowchart of a method of determining a second plurality of values using shapes of objects with the trailer angle detection system of FIG. 1 according to one embodiment.

DETAILED DESCRIPTION

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways.

A plurality of hardware and software based devices, as well as a plurality of different structural components may be used to implement embodiments discussed herein. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (for example, stored on non-transitory computer-readable medium) executable by one or more processors. As such, a plurality of hardware and software based devices, as well as a plurality of different structural components may be utilized to implement various embodiments. For example, "control units" and "controllers" described in the specification can include one or more processors, one or more memory modules including non-transitory computer-readable medium, one or more input/ output interfaces, and various connections (for example, a system bus) connecting the components.

Figure 1:
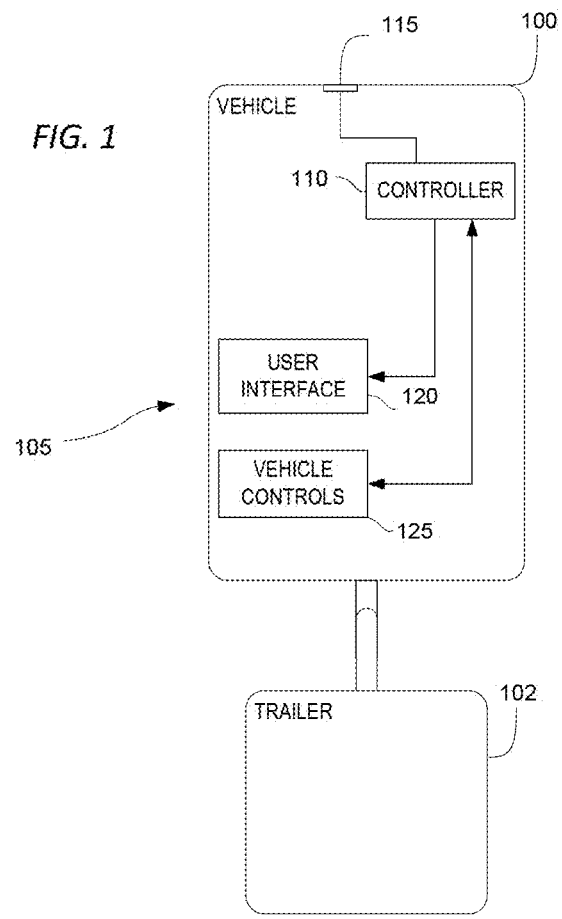
FIG. 1 is a block diagram of a vehicle equipped with an trailer angle detection system according to one embodiment.

FIG. 1 illustrates a vehicle 100 equipped with an trailer angle detection system 105 and coupled to a trailer 102. In the illustrative embodiment, the trailer angle detection system 105 is constructed of multiple components including a controller 110 (for example, a programmable electronic control unit), a wide-angle camera 115 (for example, an omnidirectional camera), a user interface 120, and a set of vehicle controls 125. The controller 110 is communicatively coupled to the wide-angle camera 115, the user interface 120, and the set of vehicle controls 125 via various wired or wireless connections. For example, in some embodiments, the controller 110 is directly coupled via a dedicated wire to each of the wide-angle camera 115, the user interface 120, and the set of vehicle controls 125. In other embodiments, the controller 110 is communicatively coupled to the wide-angle camera 115, the user interface 120, and the set of vehicle controls 125 via a shared communication link such as a vehicle communication bus (for example, a controller area network (CAN) bus) or vehicle network (for example, a wireless connection).

The components of the trailer angle detection system 105 may be of various constructions and types. For example, the wide-angle camera 115 may be wide-panoramic camera (for example, a camera with a fisheye lens) or an omnidirectional camera that produces an omnidirectional image or near-omnidirectional image of the surroundings of the vehicle 100. In some embodiments, the wide-angle camera 115 may an externally- or internally-mountable video camera, which may be configured to attach to a rear of the vehicle 100. The wide-angle camera 115 may be controlled internally and may process video or images according to hardware located internally including an electronic processor or an application specific integrated circuit (ASIC). In other embodiments, the wide-angle camera 115 may capture images and transmit the raw images to the controller 110, which may then process the raw images produced by the wide-angle camera 115. As a consequence, either the wide-angle camera 115 or the controller 110 may perform all of or some of the processing steps for image transformation, symmetry detection, and shape detection as described in the methods below.

The user interface 120 may include a display for presentation of information and status to a user of the vehicle 100. In some embodiments, the user interface 120 may display video or images captured by the wide-angle camera 115. As a consequence, the user interface 120 may assist a driver by providing a rear view from the vehicle 100 that includes the trailer 102. The user interface 120 may also include graphical indicators including guidelines, path of travel indicators, warnings, and the like that are generated by the wide-angle camera 115 or the controller 110. The user interface 120 may also include buttons, knobs, a touchscreen, etc., to receive inputs and selections from the user of the vehicle 100. In these embodiments, the controller 110 may send vehicle-related information to the display and receive user-selected instructions from the user interface 120 relating to control of the vehicle 100.

In some embodiments, the user interface 120 is externally located from the vehicle 100 and is configured to provide remote monitoring and control of the vehicle 100 by the user. For example, the user interface 120 may be a mobile device (for example, a mobile phone, a laptop, a tablet, and the like) communicatively coupled to the vehicle 100 via a wireless connection (for example, Wi-Fi, Bluetooth, and the like). In other embodiments, the user interface 120 is internally located within the vehicle 100. For example, the user interface 120 may be integrated with a navigation system, an audio system, or various other user interfaces. In any of these above-described embodiments, the user interface 120 may transmit control information relating to operation of the vehicle 100 to the controller 110 including a manually selected trailer parking angle, a manually selected reversing speed, and the like.

The set of vehicle controls 125 may include various automated controls. For example, the vehicle controls 125 may include automated steering control, automated braking control, automated throttle control, and the like. Each of the vehicle controls 125 may have a dedicated or shared control unit separate from the controller 110. The controller 110 may send control signals to the set of vehicle controls 125 to induce performance of an automated driving maneuver. For example, the set of vehicle controls 125 may implement the functions necessary to perform automated parking, automated trailer alignment, and the like.

Each of the above-listed components of the trailer angle detection system 105 may include dedicated processing circuitry including an electronic processor and memory for receiving data, processing data, and transmitting data. In this way, each of the components of the trailer angle detection system 105 may communicate with the controller 110 and perform portions of the functionality described in the methods presented herein. The exemplary embodiment illustrated in FIG. 1 provides but one example of the components and connections of the trailer angle detection system 105. However, these components and connections may be constructed in other ways than those illustrated and described.

Figure 2:
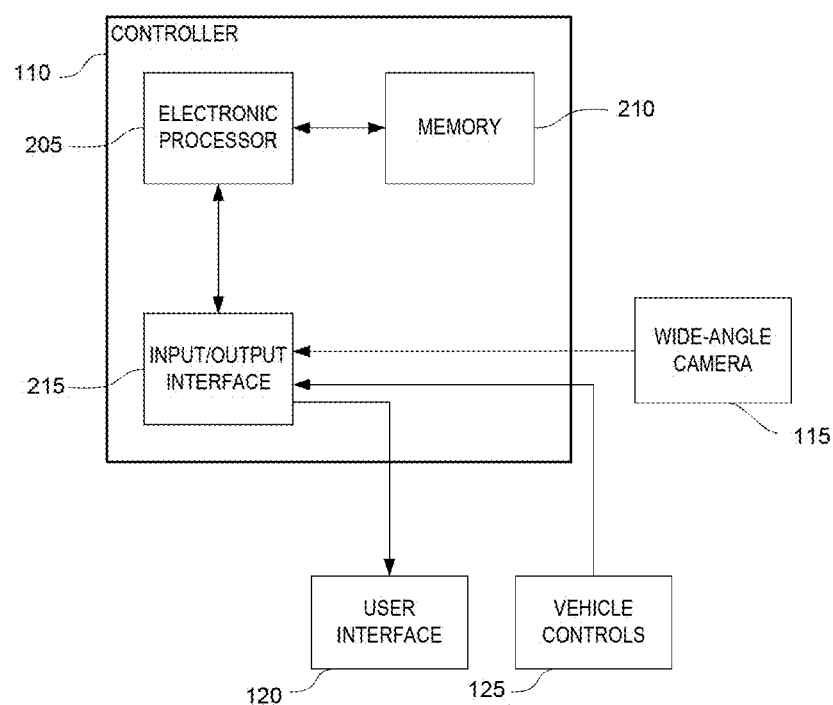
FIG. 2 is a block diagram of a controller of the trailer angle detection system of FIG. 1 according to one embodiment.

FIG. 2 is a block diagram of the controller 110 of the trailer angle detection system 105 according to one embodiment. The controller 110 includes a plurality of electrical and electronic components that provide power, operational control, and protection to the components and modules within the controller 110. The controller 110 includes, among other things, an electronic processor 205 (such as a programmable electronic microprocessor, microcontroller, or similar device), a memory 210 (for example, non-transitory, machine readable memory), and an input/output interface 215. In other embodiments, the controller 110 includes additional, fewer, or different components. The controller 110 may be implemented in several independent controllers (for example, electronic control units) each configured to perform specific functions or sub-functions. Additionally, the controller 110 may contain sub-modules that include additional electronic processors, memory, or application specific integrated circuits (ASICs) for handling input/output functions, processing of signals, and application of the methods listed below.

The controller 110 and associated systems are configured to implement, among other things, the processes and methods described herein. The electronic processor 205 is communicatively coupled to the memory 210 and executes instructions which are capable of being stored on the memory 210. The electronic processor 205 is configured to retrieve from memory 210 and execute instructions related the methods of operation of the trailer angle detection system 105. As described further below, the memory 210 may include a database that stores predetermined (for example pre-classified) images of objects to detect and classify a shape and orientation of an object for the trailer angle detection system 105. In some embodiments, the input/output interface 215 includes drivers, relays, switches, and the like to operate the set of vehicle controls 125 based on instructions from the electronic processor 205. In some embodiments, the input/output interface 215 communicates with vehicle control units and control systems by means of a protocol such as J1939 or CAN bus. In other embodiments, the input/output interface 215 communicates under other suitable protocols, including analog or digital signals, depending on the needs of the specific application.

Figure 3:
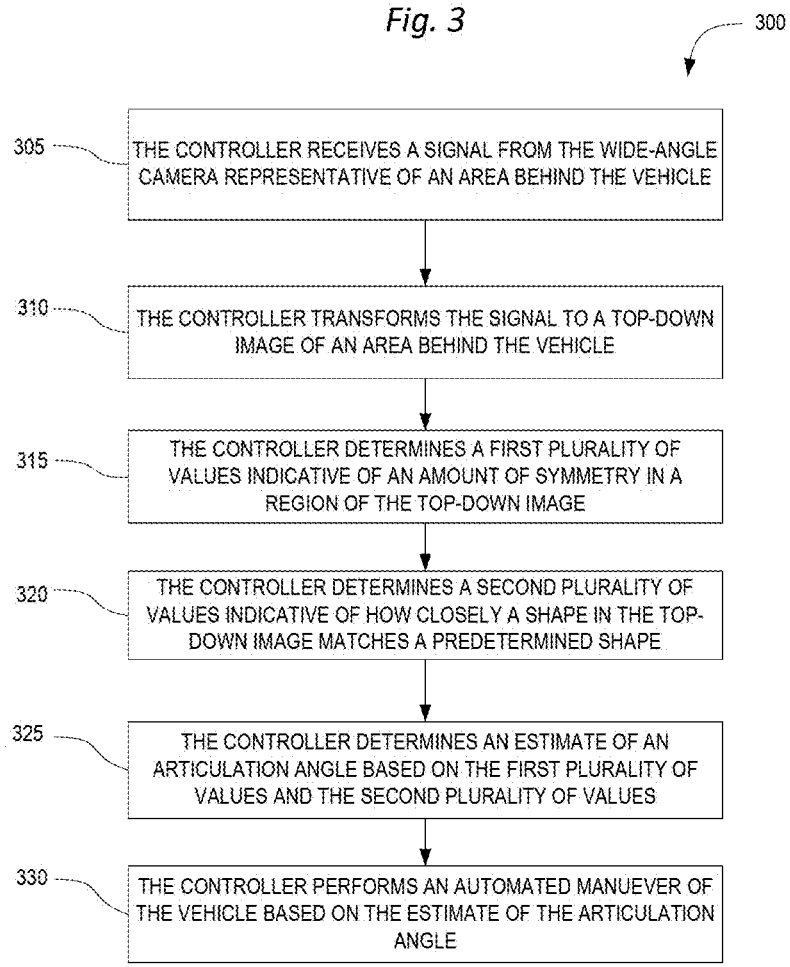
FIG. 3 is a flowchart of a method of performing angle detection with the trailer angle detection system of FIG. 1 according to one embodiment.

FIG. 3 illustrates a flowchart of a method 300 of operating the trailer angle detection system 105 according to one embodiment. In the illustrative embodiment of FIG. 3, the controller 110 receives a signal from the wide-angle camera 115 representative of an area behind the vehicle (block 305). In some embodiments, the wide-angle camera 115 captures an image including a rear portion of the vehicle 100, the area behind the vehicle 100, and objects behind the vehicle 100 (for example, the trailer 102). The controller 110 transforms the signal from the wide-angle camera 115 to a top-down image of the area behind the vehicle 100. For example, the controller 110 may be configured to perform the transformation by converting each pixel of an omnidirectional image produced by the wide-angle camera 115 to a corresponding pixel in a rectilinear image. As each pixel of the omnidirectional image is mapped to each pixel of the rectilinear image, the controller 110 shifts the field of view from one centered on the wide-angle camera 115 to a virtual top-down image representing a birds-eye view of a rear portion of the vehicle 100, an area behind the vehicle 100, and objects behind the vehicle 100 (for example, the trailer 102).

Once the top-down image is constructed, the controller 110 determines a first plurality of values indicative of an amount of symmetry in a region of the top-down image (block 315). Determination of the first plurality of values is described in more detail in a method 400 with reference to FIG. 4. The controller 110 also determines a second plurality of values indicative of how closely a shape in the top-down image matches a predetermined shape, and in some embodiments, a predetermined orientation of the shape (block 320). Determination of the second plurality of values is described in more detail in a method 500 with reference to FIG. 5.

Based on the first plurality of values and the second plurality of values, the controller 110 determines an estimate of an articulation angle (i.e., an angle of the trailer with respect to the vehicle 100) (block 325). In some embodiments, the estimate of the articulation angle is determined as an angle of a center-line of the trailer with respect to a center-line of the vehicle 100 (i.e., a virtual line perpendicular to the rear axle of the vehicle 100). Based on the estimate of the articulation angle, the controller 110 performs an automated maneuver of the vehicle 100 (block 330). In particular, the automated maneuver may include automated parking of the vehicle 100 and trailer 102. In this example, the controller 110 sends instructions to the set of vehicle controls 125 to maneuver the vehicle 100 and the trailer 102 into a user-selected parking spot. In other embodiments, the controller 110 sends instructions to perform various other maneuvers based on the estimated articulation angle such as trailer alignment, stability control, automated driving, and the like.

The order of the steps of the method 300 are not critical to the performance of the method 300 and may be performed in alternate orders or performed simultaneously. In one embodiment, the method 300 is cycled through multiple iterations that continuously update the estimation of the articulation angle as the vehicle 100 performs the automated driving maneuver.

Figure 4:
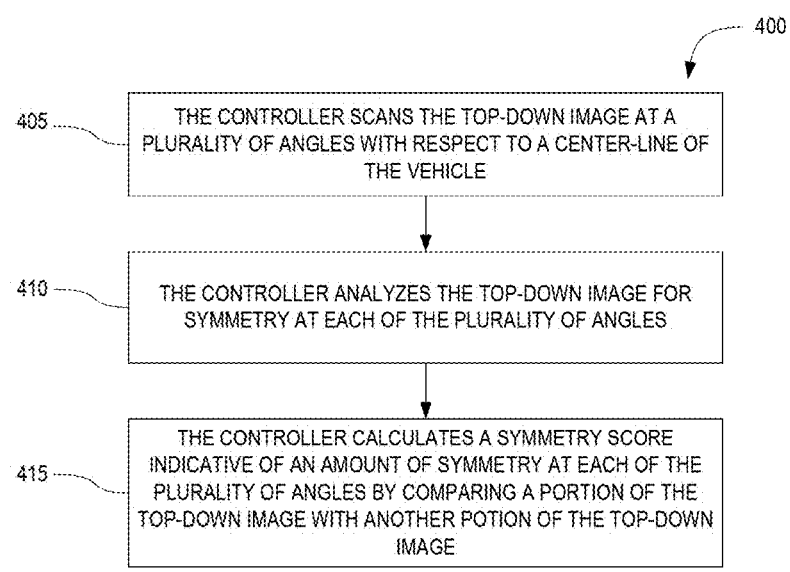
FIG. 4 is a flowchart of a method of determining a first plurality of values using symmetry with the trailer angle detection system of FIG. 1 according to one embodiment.

FIG. 4 illustrates a flowchart of a method 400 of determining the first plurality of values indicative of the amount of symmetry in the top-down image (see block 315) according to one embodiment. In the illustrative embodiment, the controller 110 scans the top-down image at a plurality of angles (i.e., measurement angles) with respect to the center-line of the vehicle 100 (block 405). The controller 110 analyzes the top-down image for symmetry at each of the plurality of angles (block 410).

The controller 110 calculates a symmetry score indicative of the amount of symmetry at each of the plurality of angles (block 415). For example, the controller 110 may compare a first portion of the top-down image on a first side of one of the reference lines with a second portion of the top-down image on a second side of the one of the reference lines. As described in more detail below, the controller 110 may compare each pixel of the first portion with each pixel of the second portion to generate a symmetry score.

FIG. 5 illustrates a flowchart of a method 500 of determining the second plurality of values indicative of how closely the shape in the top-down image matches the predetermined shape (see block 320) according to one embodiment. In the illustrative embodiment, the controller 110 scans the top-down image at the plurality of angles with respect to the center-line of the vehicle 100. The controller 110 analyzes the top-down image for a shape at each of the plurality of angles (block 510). The controller 110 calculates a shape score indicative of how closely the shape matches a predetermined shape at each of the plurality of angles (block 515). In some embodiments, when performing the scan of the top-down image, the controller 110 calculates the shape score based on how closely the shape in the top-down image matches a predetermined U-shape and orientation.

In one embodiment of the method 400 and the method 500, when analyzing the top-down image, the controller 110 sets an origin at a bottom center of the top-down image. The origin may coincide approximately with a location of the wide-angle camera 115 within the top-down image. In this embodiment, the controller 110 sets a plurality of reference lines each extending radially from the origin across the top-down image. Each of the plurality of reference lines being defined by each of the plurality of angles from the center-line. In addition, in some embodiments, the scan of the top-down image in block 405 and block 505 of method 400 and method 500, respectively, occurs at angle intervals of 1° from −90° to 90°. As a consequence, the controller 110 may perform scanning at 180 angles and at 180 reference lines for both methods. In other embodiments, larger or smaller angle intervals are used depending on the resolution or accuracy needed for the particular application.

Figure 6A:
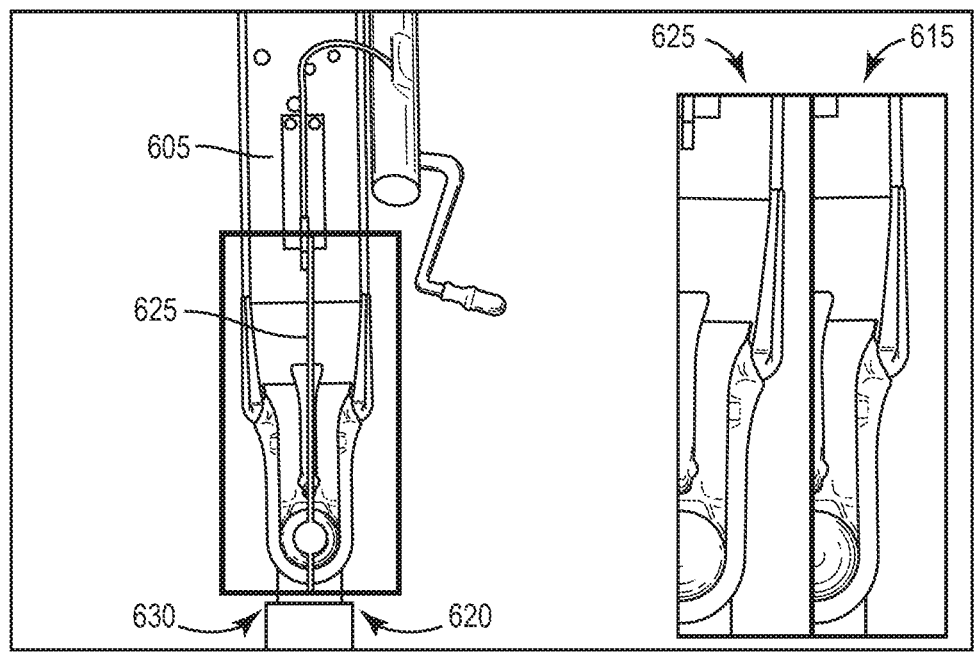
FIGS. 6A and 6B are top-down images of a trailer coupler captured by the trailer angle detection system of FIG. 1, which are analyzed to determine symmetry according to one embodiment.
Figure 6B:
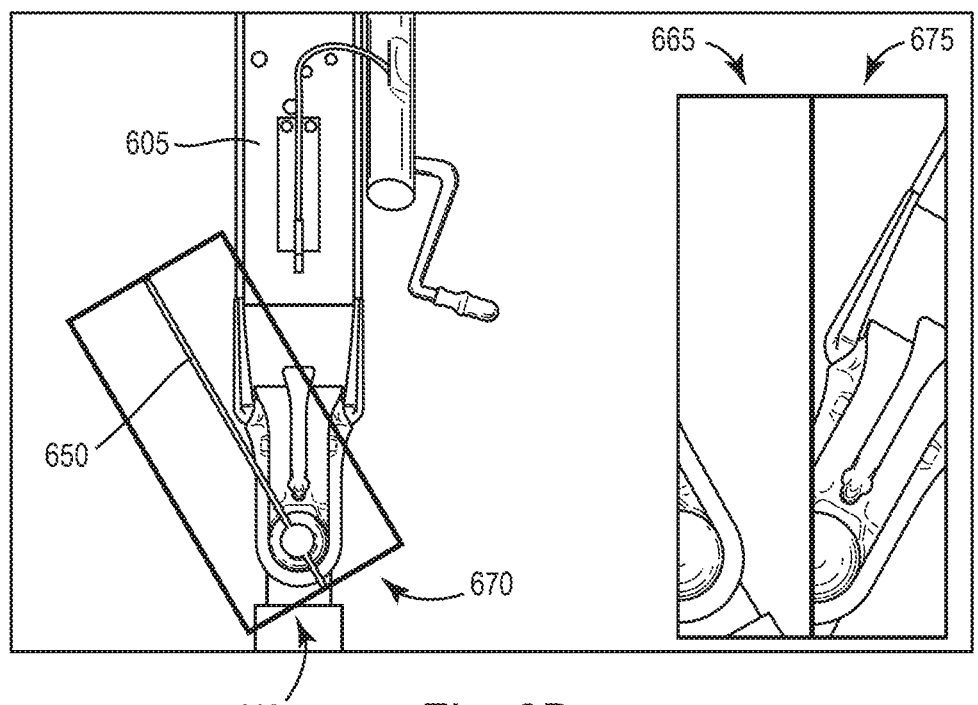

FIGS. 6A and 6B illustrate portions of examples of the top-down image including a trailer coupler 605 of the trailer 102 captured by the trailer angle detection system 105 according to one embodiment. In FIGS. 6A and 6B, a center-line of the trailer coupler 605 is approximately aligned with a center-line of the vehicle 100. In particular, FIGS. 6A and 6B illustrate a portion of the top-down image with the center-line of the trailer 102 at a −1° angle from the center-line of the vehicle 100. This indicates that the articulation angle of the trailer is also at −1° with reference to the center-line of the vehicle 100. Based on the top-down image captured on the left-side of FIG. 6A, the controller 110 generates the plurality of angles and the plurality of reference lines as described in the method 400 above.

In the illustrative example of FIG. 6A, the center-line of the vehicle 100 corresponds to a first example of one of the plurality of reference lines, which is defined at the center-line of the vehicle 100 to be a 0° reference line 610. Based on the 0° reference line 610, a first image 615 on a first side 620 of the 0° reference line 610 and a second image 625 on the second side 630 of the 0° reference line 610 is analyzed by the controller 110. One of the first image 615 or the second image 625 may be inverted (for example, forming a mirror image) for comparison of symmetry by the controller 110, which in this illustrative example is the second image 625. Since the articulation angle of the trailer (−1°) is close to the 0° reference line 610, the first image 615 and the second image 625 are closely matched. As a consequence, the controller 110 assigns a symmetry score indicating a high level of symmetry for the 0° reference line 610.

Similarly, FIG. 6B illustrates portions of examples of the top-down image including the trailer coupler 605 of the trailer 102 captured by the trailer angle detection system 105 according to one embodiment. In the illustrative example of FIG. 6B, a second example of one of the plurality of reference lines is illustrated in the portion of the top-down image. In particular, a −30° reference line 650 is illustrated with the trailer 102 still positioned at the −1° articulation angle. Based on the −30° reference line 650, a first image 655 on a first side 660 of the −30° reference line 650 and a second image 665 on a second side 670 of the −30° reference line 650 is analyzed by the controller 110. As in the previous example, one of the first image 655 or the second image 665 may be inverted (for example, forming a mirror image) for comparison of symmetry by the controller 110, which in this illustrative example is the second image 665. Since the articulation angle of the trailer (−1°) is considerably different than the −30° reference line 650, the first image 655 and the second image 665 are not similar, and thus, the controller 110 assigns a symmetry score indicating a low level of symmetry for the −30° reference line 650.

Figure 7:
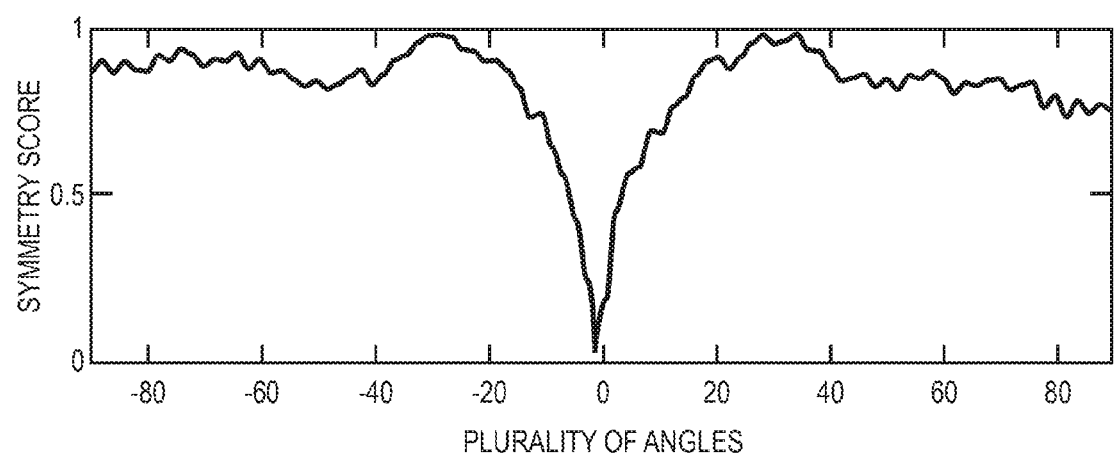
FIG. 7 is a chart of a symmetry score over a plurality of angles based on the top-down images of the trailer coupler of FIGS. 6A and 6B according to one embodiment.

As described in reference to FIG. 4, the controller 110 analyzes portions of the top-down image at all of the plurality of angles for symmetry. An exemplary analysis is plotted in FIG. 7 for the trailer coupler 605 as illustrated in FIGS. 6A and 6B. The symmetry score is plotted on the vertical axis and the plurality of angles are plotted on the horizontal axis. In this example, the actual articulation angle of the trailer with respect to the vehicle 100 is −1° from the center-line of the vehicle 100. As a consequence, at a −1° reference line, the top-down image captured by the wide-angle camera 115 is almost completely symmetrical and thus, the symmetry score indicates a high level symmetry, which in this embodiment is illustrated as a low numerical value. However, in other embodiments, the symmetry score indicates a high level of symmetry with a high numerical value.

Figure 8A:
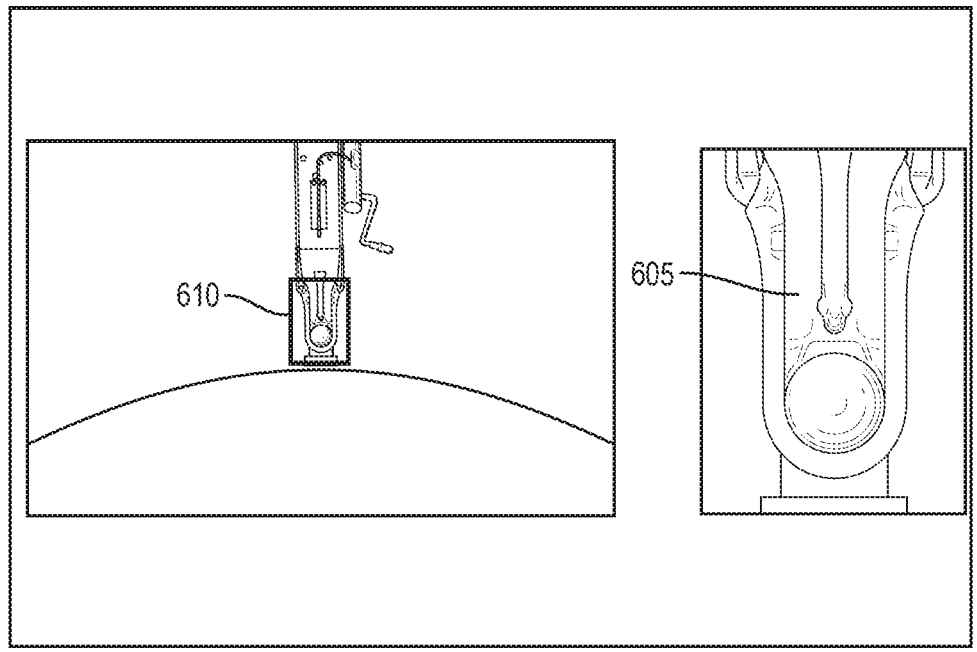
FIGS. 8A and 8B are top-down images of a trailer coupler captured by the trailer angle detection system of FIG. 1, which are analyzed for shape and orientation according to one embodiment.
Figure 8B:
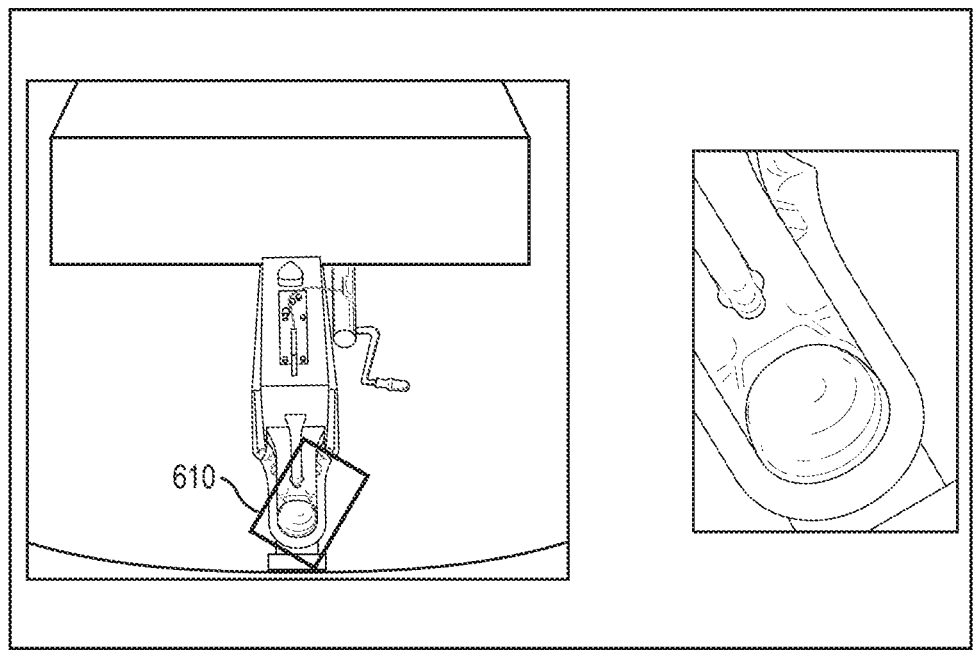

FIGS. 8A and 8B illustrate an example of the top-down image including the trailer coupler 605 positioned in the same configuration as in FIGS. 6A and 6B. In particular, FIGS. 8A and 8B illustrate the trailer 102 at a −1° articulation angle. Based on the top-down image captured on the left-side of FIG. 8A, the controller 110 analyzes the top-down image for a shape at each of the plurality of angles as described in the method 500 above. For example, the controller 110 detects shapes within the top-down image and compares the shapes to a predetermined shape stored within the memory 210 of the controller 110. In some embodiments, the predetermined shape is an upright U-shape approximating the shape of a typical trailer coupler. When the trailer coupler 605 is positioned at an articulation angle significantly different than a −0° articulation angle, the trailer coupler 605 appears in the top-down image as a U-shape that is orientated to one side or the other. When the controller 110 analyzes the top-down image for shape, the controller 110 may correct the orientation of the detected shape in the top-down image or the orientation of the predetermined shape based on the measurement angle to align the shapes for comparison. In one exemplary embodiment, when the U-shape of the trailer coupler 605 is detected at a −30° articulation angle, the controller 110 may rotate the U-shape by 30° before comparing to the predetermined shape. In another exemplary embodiment, when the U-shape of the trailer coupler 605 is detected at the same −30° articulation angle, the controller 110 may rotate the predetermined shape by 30° before comparison.

In the illustrative example of FIG. 8A, shape detection at a 0° measurement angle (i.e., center-line of the vehicle 100) of the plurality of angles is shown. The box 810 illustrates shape detection of a U-shaped object (i.e., the perimeter of the trailer coupler 605). A close-up view illustrated on the right side of FIG. 8A shows the U-shape of the trailer coupler 605. Since the trailer coupler 605 is positioned at an articulation angle of −1°, the 0° measurement angle provides a top-down image with a shape that is closely related to the predetermined U-shape. However, as the U-shape is slightly off orientation, and since no rotation correction occurs at the 0° measurement angle, the shape score will not indicate the highest match. In this example, shape detection at a −1° measurement angle would result in an exact match after rotation correction.

FIG. 8B illustrates shape detection at a 30° measurement angle. In this case, the controller 110 analyzes the top-down image as illustrated on the right-side of FIG. 8B. In this example, the top-down image on the right-side of FIG. 8B has been corrected for orientation by rotating −30° based on the 30° measurement angle. As illustrated, the U-shape is present, but the orientation does not match the predetermined upright U-shape. As a consequence, the shape score at the 30° measurement angle indicates a poor match.

Figure 9:
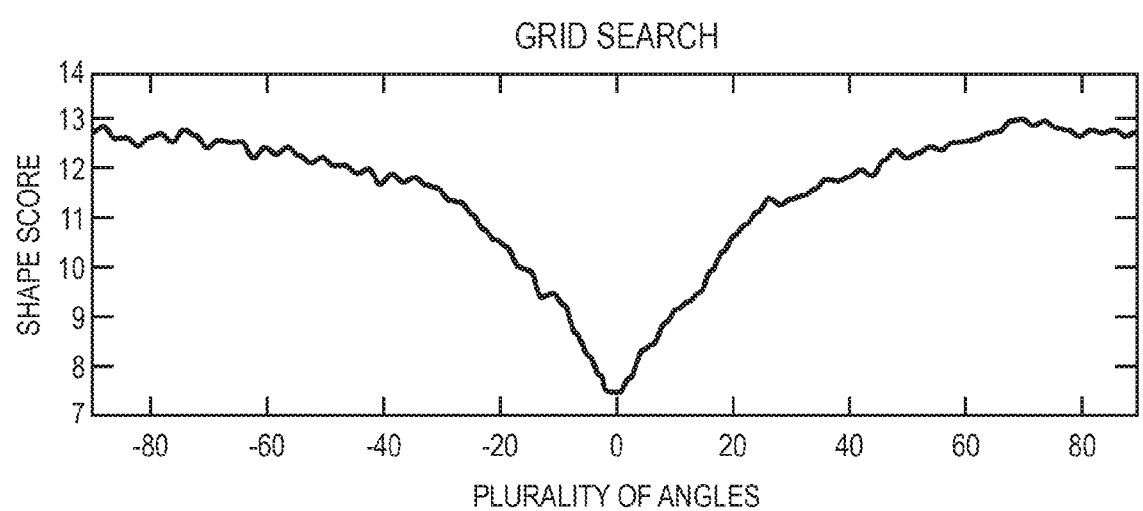
FIG. 9 is a chart of shape score over a plurality of angles based on the top-down images of the trailer coupler of FIGS. 8A and 8B according to one embodiment.

An exemplary analysis is plotted in FIG. 9 for the trailer coupler 605 as illustrated in FIGS. 8A and 8B. The shape score is plotted on the vertical axis and the plurality of angles are plotted on the horizontal axis. As in the previous example, the actual articulation angle of the trailer with respect to the vehicle 100 is −1° from the center-line of the vehicle 100. As a consequence, at the −1° measurement angle, the top-down image captured by the wide-angle camera 115 is nearly an exact match with the predetermined U-shape and orientation and thus, the shape score indicates a high level of match, which in this embodiment is illustrated as a low numerical value. However, in other embodiments, a high numerical value of a shape score may indicate a high level of match.

Once, both the symmetry score and the shape score are determined at the plurality of angles, the controller 110 compares the symmetry score and the shape score to determine at which measurement angle is the symmetry and the shape-match greatest. For example, the controller 110 may combine the results plotted in FIG. 7 and FIG. 9 and determine that at the −1° measurement angle the symmetry and the shape-match are greatest (for example, the combination may be multiplication, summation, or other combination). In this example, once the symmetry score and the shape score are compared, the controller 110 produces the estimate of the articulation angle to equal the −1° measurement angle.

Thus, embodiments of the invention provide, among other things, a trailer angle detection system and method for operating a vehicle equipped with the trailer angle detection system. The trailer angle detection system and associated methods determine an estimated articulation angle of the trailer by various image processing techniques and perform an automated vehicle maneuver based on the articulation angle.

Various features and advantages of the invention are set forth in the following claims.

What is claimed is:

1. A trailer angle detection system for a vehicle, the system comprising:
    a wide-angle camera configured to capture a rear field-of-view of the vehicle; and
    a controller including an electronic processor and a memory, the controller communicatively coupled to the wide-angle camera and configured to
        receive a signal from the wide-angle camera representative of an area behind the vehicle;
        transform the signal into a top-down image;
        determine a first plurality of values, each of the first plurality of values indicative of an amount of symmetry in a region of the top-down image;
        determine a second plurality of values, each of the second plurality of values indicative of how closely a shape in the top-down image matches a predetermined shape, wherein the predetermined shape is a U-shape representative of a trailer coupler;
        determine an estimate of an articulation angle based on the first plurality of values and the second plurality of values; and
        perform an automated vehicle maneuver based on the estimate of the articulation angle.

2. The trailer angle detection system of claim 1, further comprising:
    a user interface communicatively coupled to the controller, the user interface configured to receive instructions from a user relating to the automated vehicle maneuver.

3. The trailer angle detection system of claim 2, wherein the user interface is a mobile device externally located from the vehicle.

4. The trailer angle detection system of claim 1, further comprising a display configured to display the top-down image to a user of the vehicle.

5. The trailer angle detection system of claim 1, wherein the controller is configured to determine the first plurality of values by scanning the top-down image at a plurality of angles and determining a symmetry score for each of the plurality of angles.

6. The trailer angle detection system of claim 5, wherein the controller is configured to calculate the symmetry score by comparing a first region on a first side of a reference line defined by one of the plurality of angles with a second region on a second side of the reference line.

7. The trailer angle detection system of claim 1, wherein the controller is configured to determine the second plurality of values by scanning the top-down image at a plurality of angles and determining a shape score at each of the plurality of angles, wherein the shape score is indicative of how closely a shape of an object within the top-down view matches a predetermined shape.

8. The trailer angle detection system of claim 1, wherein the controller is configured to perform the automated vehicle maneuver based on the estimate of the articulation angle by automatically parking the vehicle.

9. A method of performing trailer detection for a vehicle, the method comprising:
    receiving, at a controller, a signal from a wide-angle camera representative of of an area behind the vehicle;
    transforming the signal into a top-down image;
    determining, by the controller, a first plurality of values, each of the first plurality of values indicative of an amount of symmetry in a region of the top-down image;
    determining, by the controller, a second plurality of values, each of the second plurality of values indicative of how closely a shape in the top-down image matches a predetermined shape, wherein the predetermined shape is a U-shape representative of a trailer coupler;
    determining, by the controller, an estimate of an articulation angle based on the first plurality of values and the second plurality of values; and
    performing an automated vehicle maneuver based on the estimate of the articulation angle.

10. The method of claim 9, further comprising receiving instructions, at the controller, from a user interface, the instructions relating to the automated vehicle maneuver.

11. The method of claim 10, wherein receiving instructions includes receiving instructions from a mobile device externally located from the vehicle.

12. The method of claim 9, further comprising displaying the top-down image on a display for viewing by a user of the vehicle.

13. The method of claim 9, wherein determining the first plurality of values includes scanning the top-down image at a plurality of angles and determining a symmetry score for each of the plurality of angles.

14. The method of claim 13, wherein determining the symmetry score includes comparing a first region on a first side of a reference line defined by one of the plurality of angles with a second region on a second side of the reference line.

15. The method of claim 9, wherein determining the second plurality of values includes
    scanning the top-down image at a plurality of angles; and
    determining a shape score at each of the plurality of angles, wherein the shape score is indicative of how closely a shape of an object within the top-down view matches a predetermined shape.

16. The method of claim 9, wherein performing the automated vehicle maneuver based on the estimate of the articulation angle includes automatically parking the vehicle.

* * * * *